Feb. 6, 1934.　　　　B. B. FOX　　　　1,946,156

CHECK FOR STEERING MECHANISM

Filed Sept. 17, 1932

Inventor
Brenner B. Fox,

By Irving L. McCathran
Attorney

Patented Feb. 6, 1934

1,946,156

UNITED STATES PATENT OFFICE 1,946,156

CHECK FOR STEERING MECHANISM

Brenner B. Fox, San Antonio, Tex., assignor of one-third to Herman Beyer, San Antonio, Tex.

Application September 17, 1932
Serial No. 633,670

1 Claim. (Cl. 280—89)

This invention relates to a steering mechanism attachment especially adapted to brace the wheels of a vehicle and to eliminate shimmy action in the wheels.

Another object of this invention is the production of a simple and efficient means for providing a gear step-up wherein the gear ratio is of such a nature as to prevent the reversal thereof without exerting a force several times that which is necessary to put the gear mechanism in motion.

Another object of the invention is the production of a simple and efficient means for use in connection with the steering mechanism of a motor vehicle or the like, which is so constructed as to prevent the jerking of the steering mechanism from a standstill position into instantaneous motion.

A further object of this invention is the production of a simple and efficient mechanism to be used in conjunction with the steering apparatus of a vehicle which will constitute a safety device or factor in that all sudden jerks on the steering mechanism will be eliminated, such for instance as the jerk which ordinarily occurs should a tire blow-out, in that an interval will be provided between the time of the blow-out and the time of the side pull which under ordinary conditions without such an apparatus would be likely to overturn the car.

A still further object of this invention is the production of a simple and efficient means which may be easily and quickly attached to the front axle of a vehicle and connected to the tie rod of the steering mechanism of a vehicle for holding the steering wheels of a vehicle against vibration.

With these and other objects in view, this invention consists in certain novel constructions, combinations and arrangements of parts as will be hereinafter set forth in the following specification and claim.

In the drawing:—

Figure 1:
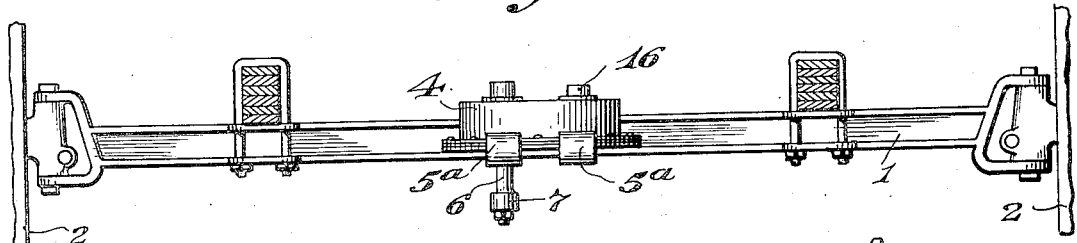
Figure 1 is a front elevation of the device as applied to the axle of a vehicle.
Figure 2:
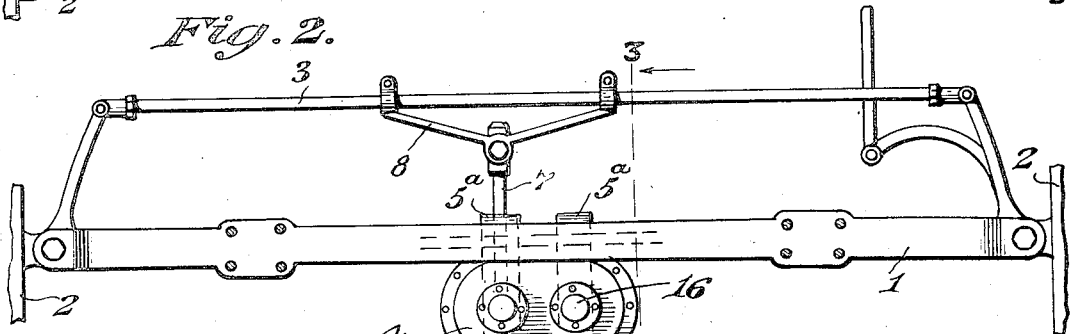
Figure 2 is a top plan view as applied to the axle of a vehicle.
Figure 3:
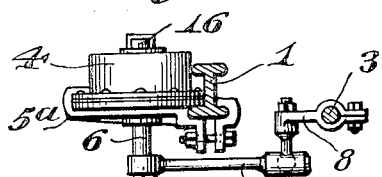
Figure 3 is a section taken on line 3—3 of Figure 2.

By referring to the drawing, it will be seen that 1 designates the axle which is supported in any suitable or desired manner upon the steering wheels 2, the steering wheels 2 being tied together by the conventional tie rod 3.

Although the present steering mechanism attachment may be mounted in any suitable or desired manner upon the vehicle, and in any suitable or desired location, it has been found practical to mount the attachment which constitutes a check upon the steering mechanism in conjunction with the front axle 1. The attachment comprises preferably an oil-tight casing 4 preferably formed of a plurality of sections secured together in any desired or convenient manner, and sealed against the dripping of oil therefrom by providing a gasket 5 between the sections of the casing. The casing 4 may be secured to the front axle in any suitable or desired manner and may be preferably supported in combination therewith by means of suitable clamps 5a.

Mounted vertically within the casing 4 is a main shaft 6 which carries an operating arm 7 at one end, the operating arm 7 being connected in any suitable or desired manner to the yoke 8, which yoke 8 is clamped in engagement with and connected to the tie rod 3, as shown.

The shaft 6 passes through the casing 4 and a suitable packing 9 is employed near one end and a suitable packing 10 near the other end to constitute an oil seal. The casing 4 is preferably filled with oil to permit the gear mechanism hereinafter described to continue working within the oil filled casing.

Figure 6:
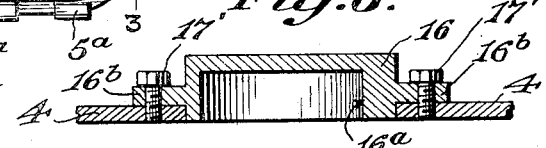
Figure 6 is a vertical section through the eccentric housing which engages the end of the auxiliary shaft.
Figure 7:
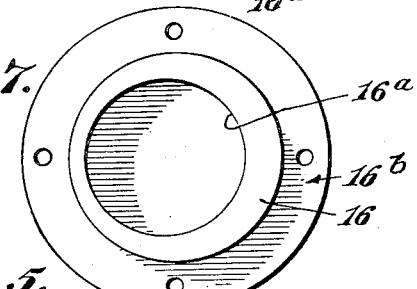
Figure 7 is a bottom plan view of the eccentric housing.
Figure 4:
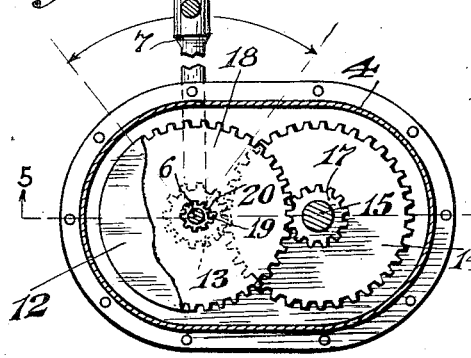
Figure 4 is an enlarged top plan view of the gear mechanism, certain portions thereof being shown in section.

The main shaft 6 carries a sleeve 11 which sleeve is mounted within the casing 4 and keyed to this sleeve 11 is a fly-wheel 12, as shown. A primary drive pinion 13 is also keyed to the sleeve 11 below the fly-wheel 12 and this primary drive pinion 13 meshes with an enlarged or step-up gear 14, which step-up gear 14 is keyed to an auxiliary shaft 15 extending vertically of the casing 4. Suitable ball bearings or bushings 16' are located at the ends of the shaft 15, which bushings 16' are carried within the eccentric housings 16. As shown in detail in Figures 6 and 7, the eccentric housing 16 is provided with an eccentric socket 16a in which the bushing 16' fits and an annular flange 16b is formed around the eccentric housing 16 for the purpose of receiving securing bolts 17', which bolts pass through threaded openings in the casing 4 and permit the proper adjustment of the eccentric housing 16 upon the casing 4.

Figure 5:
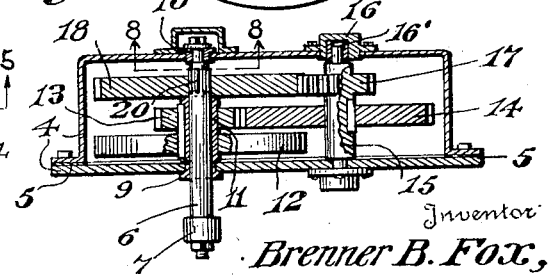
Figure 5 is a section taken on line 5—5 of Figure 4.
Figure 8:
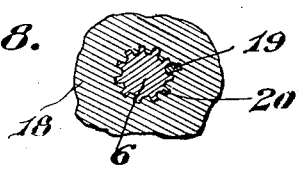
Figure 8 is a section taken on line 8—8 of Figure 5.

Located above the step-up gear 14 is an auxiliary pinion 17 which is keyed to the shaft 15 and this pinion 17 in turn meshes with a pinion 18 which is locked and keyed to the shaft 6 by means of a suitable key 19 fitting into meshing engagement with the teeth 20 formed upon the lower end of the shaft 6. It should be noted that the sleeve 11 is distinct and separate from the gear 18 and is free to rotate about the shaft 6. It should also be noted that the present structure will permit the steering mechanism to return to its normal straight-away position after making a turn without help at the steering wheel. As shown in Figure 5, the ends of the shaft 15 are journaled within the eccentric housings 16 and by adjusting or rotating the housing 16 upon the casing 4, it will be seen that the gears 14 and 17 may be moved into and out of snug meshing relation with the gears 13 and 18.

From the foregoing description and by carefully considering the drawing it will be noted that the series of gears illustrated and described will multiply the inertia of the fly-wheel 12 and at the same time allow a decrease in the size and weight of the fly-wheel. This structure will also produce a great resistance to sudden movement of the steering mechanism and at the same time will allow the smooth turning of the steering wheel without appreciable resistance. As previously described, the gears are preferably completely enclosed within an oil-tight casing only the operating arm and operating shaft being exposed or extended beyond the casing. Suitable packing glands may be provided for the purpose of producing this oil-tight casing and for the purpose of preventing leakage.

It should be further understood that the principle employed in the present device, that a body traveling in a given direction, cannot be reversed without exerting a force several times the force necessary to keep the body in motion, nor may it be jerked from a standstill into instantaneous movement. It has been found convenient to use a gear ratio of the fly-wheel to the arm of 10, 15, or 20 to 1, according to the size of the car upon which the device is to be applied.

It should be further understood that any suitable type of bearing or bushing may be employed without departing from the spirit of the invention and that the device may be placed in any convenient location in conjunction with the steering mechanism and any suitable hydraulic shock absorbing means of the conventional type may be employed in conjunction with the steering mechanism without departing from the spirit of the invention. The normal placing of the device, however, is directly in front of the center axle with the arm 7 making a universal contact with the tie rod of the same radius as the arm or the spindle arm of the car.

Certain detail changes in the mechanical construction, combination or arrangement of parts may be employed without departing from the spirit of the invention so long as these changes fall within the scope of the appended claim.

Having described the invention, what is claimed as new is:—

A steering check for vehicles comprising a casing, means to connect said casing with an axle of a vehicle intermediate the length of the axle and support the casing in a horizontal position, a shaft extending vertically in said casing and rotatably mounted with a portion projecting from the casing, a fly wheel rotatable about said shaft within the casing, a train of gearing in the casing for transmitting rotation from said shaft to said fly wheel, an arm fixed to said shaft externally of the casing and projecting radially from the shaft to extend towards a tie rod of a steering gear, and a yoke pivoted to said arm and having diverging arms terminating in rod engaging clamps.

BRENNER B. FOX.